United States Patent [19]

Kitamura

[11] Patent Number: 5,058,261
[45] Date of Patent: Oct. 22, 1991

[54] MACHINE TOOL

[75] Inventor: Koichiro Kitamura, Takaoka, Japan

[73] Assignee: Kitamura Machinery Co., Ltd., Toyama, Japan

[21] Appl. No.: 445,656

[22] PCT Filed: Apr. 10, 1989

[86] PCT No.: PCT/JP89/00382
§ 371 Date: Jan. 9, 1990
§ 102(e) Date: Jan. 9, 1990

[87] PCT Pub. No.: WO89/09675
PCT Pub. Date: Oct. 19, 1989

[30] Foreign Application Priority Data

Apr. 12, 1988 [JP] Japan .................. 63-88316

[51] Int. Cl.⁵ .................. B23Q 3/155; B23B 3/22
[52] U.S. Cl. .................. 29/568; 29/27 R; 29/27 C; 408/24; 409/231
[58] Field of Search .................. 408/22, 23, 24; 409/231, 233; 29/26 A, 27 A, 27 R, 27 C, 568

[56] References Cited

U.S. PATENT DOCUMENTS 3,267,550  8/1966  Whittum et al.
3,483,767  12/1969  Schachte
3,803,680  4/1974  Kuhnert .................. 408/23
4,304,513  12/1981  Roch .................. 409/233
4,730,373  3/1988  Senoh .................. 29/26 A
4,777,713  10/1988  Kitamura .................. 29/568
4,809,422  3/1989  Kitamura .................. 29/33 P
4,840,095  6/1989  Nussbaumer et al. .................. 29/27 C

FOREIGN PATENT DOCUMENTS 3220026  12/1983  Fed. Rep. of Germany ...... 409/189
2555086  5/1985  France .................. 409/189
62-88536  4/1987  Japan.

Primary Examiner—Daniel W. Howell
Attorney, Agent, or Firm—Ronald P. Kananen

[57] ABSTRACT

This invention relates to a machine tool which can do multiple operations such as drilling and turning operations on a workpiece once the workpiece is attached onto the workhead, thereby obtaining time savings in loading the workpiece and maintaining quality in the operations. According to this invention, a workhead (4) has a spindle (16). The toolhead (5) has a spindle (42). A first indexing means (6) indexes the direction of the axis of the spindle (42). A second indexing means (8) indexes the spindle (16) in the first direction (A). A first stopping means (9) stops rotation of the spindle (16) when necessary. A second stopping means (11) stops rotation of the spindle (42) when necessary. A first driving means (7) and a second driving means j(10) rotate, respectively, the spindle (16) and the spindle (42). Driving systems (12, 13) are designed to move the workhead (4) and the toolhead (5) relative to each other in a three dimensional manner.

13 Claims, 9 Drawing Sheets

Legend: CNC (Computer Numerical Control)

MACHINE TOOL

BACKGROUND OF THE INVENTION

This invention relates to a machine tool for performing multiple processing operations on a workpiece.

For example, consider the case where an outer surface of a cylindrical workpiece is turned and then a hole is bored in the workpiece. First, in order to have these operations done on the workpiece, the workpiece is loaded in a chuck of a lathe and then turned by a turning tool bit. Then, it is removed from the lathe and set onto a boring machine to perform a boring operation by a drill. As a consequence, much time is wasted loading and removing the workpiece and it is also difficult to maintain high quality processing requirements.

SUMMARY OF THE INVENTION

This invention relates to a machine tool which can perform multiple processing operations on the workpiece once the workpiece is loaded onto the machine tool.

Referring to FIG. 1, a workhead 4 has a spindle 16. A workpiece is detachably attached to the spindle 16. A toolhead 5 has a spindle 42. A tool bit is detachably attached to the spindle 42. A machine tool body 1 has the workhead 4 and the toolhead 5. A first indexing means 6 is designed to index the axis of the spindle 16 of the workhead 4 with respect to the axis of the spindle 42 of the toolhead 5. A first driving means 7 can continuously rotate the spindle 16 of the workhead 4 in the first direction A. A second indexing means 8 indexes the spindle 16 of the workhead 4 in the first direction A. A first stopping means 9 can stop rotation of the spindle 16 of the workhead 4 if necessary. A second driving means 10 can rotate the spindle 42 of the toolhead 5.

A second stopping means 11 can stop rotation of the spindle 42 of the toolhead 5 if necessary. Driving systems 12, 13 are provided on the body 1 and make it possible to move the workhead 4 and the toolhead 5 relative to each other in a three dimensional manner. Consider the case where multiple processing operations such as turning and boring operations on the workpiece W are done. In this instance, the work can be carried out without removing the workpiece W from the workhead 4.

BEST MODE FOR CARRYING OUT THE INVENTION

Figure 1:
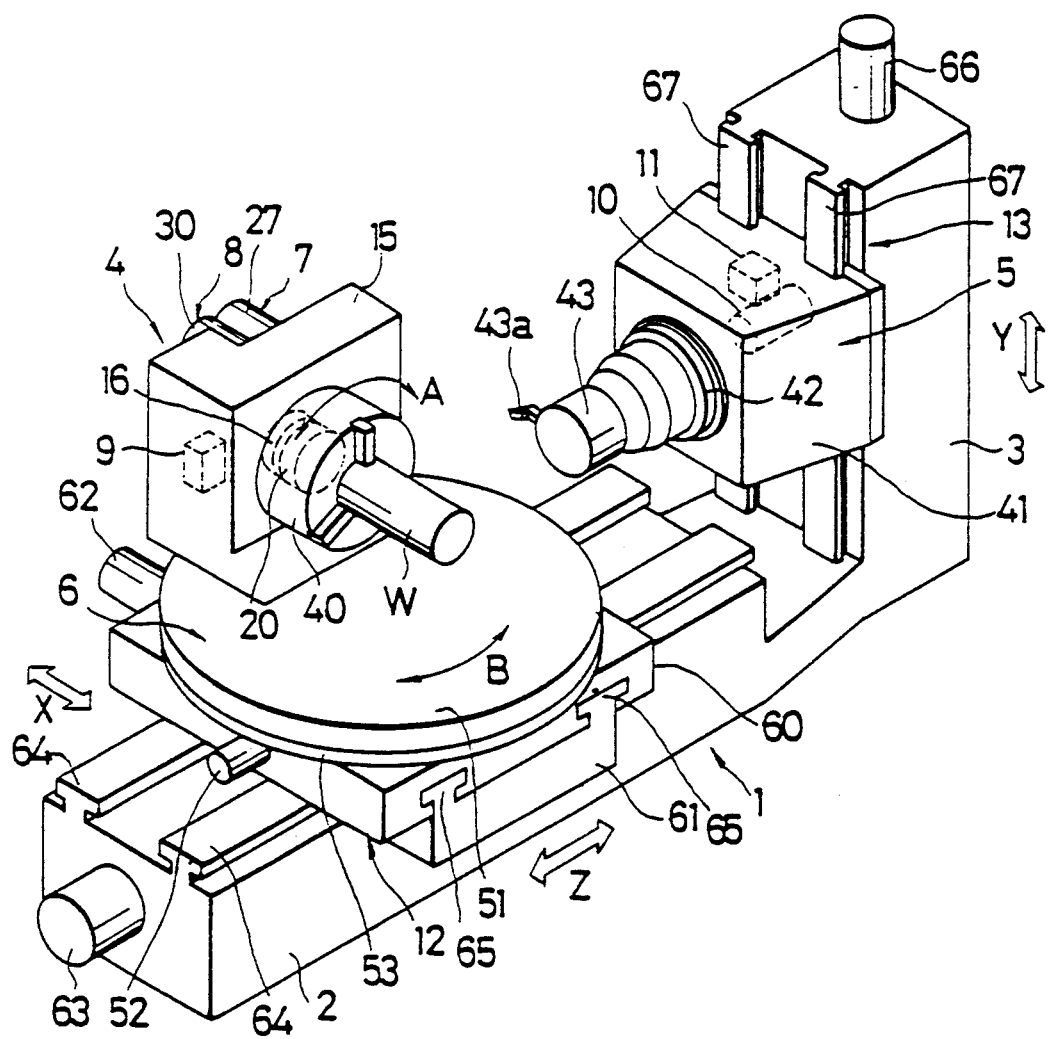
FIG. 1 is a perspective view showing an embodiment of a machine tool according to this invention.

Referring to FIG. 1, a machine tool according to this invention has a body 1, a workhead 4, a toolhead 5, a first indexing means 6, a first driving means 7, a second indexing means 8, a first stopping means 9, a second driving means 10, a second stopping means 11, and driving systems 12, 13.

Body 1

The body 1 of FIG. 1 comprises a bed 2 and a column 3.

Workhead 4

Figure 2:
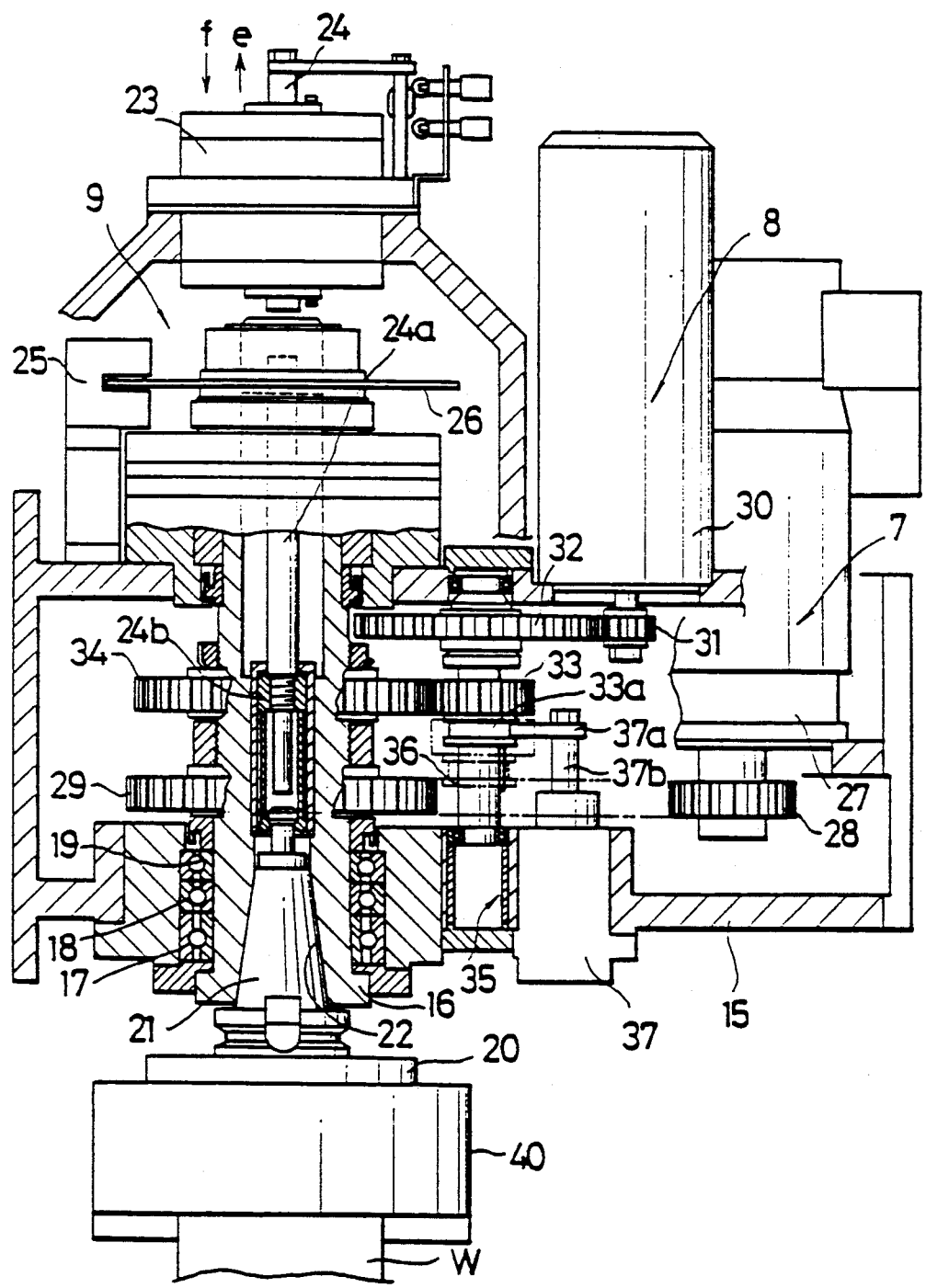
FIG. 2 shows the internal structure of the workhead.

Referring to FIGS. 1 and 2, a casing 15 of the workhead 4 is provided with the first driving means 7, the second indexing means 8 and the first stopping means 9.

A spindle 16 is rotatably supported by a casing 15 through bearings 17 to 19. A workholder 20 is detachably attached to the spindle 16 in the conventional collet-chuck manner. A tapered portion 21 of the workholder 20 is designed to fit into a hole 22 of the spindle 16.

A rod 24 of a hydraulic system 23 can be moved in the direction of an arrow e. While doing this, the tapered portion 21 of the workholder 20 can be inserted into the hole 22. The tapered portion 21 can be also removed from the hole 22 by moving the rod 24 in the direction of an arrow f.

The stopping means 9 is located around the other end of the spindle 16. The first stopping means 9 comprises a hydraulic brake equipment 25 and a rotor 26. The hydraulic brake equipment 25 is placed in the casing 15. The rotor 26 is fixed to the other end of the spindle 16. Rotation of the rotor 26, that is, rotation of the spindle 16, can be stopped if necessary by the hydraulic brake equipment 25.

The first driving means 7 has a motor 27, gears 28 and 29. The gear 28 is fixed to the output shaft of the motor 27. The gear 29 is fixed to the spindle 16. The gears 28 and 29 can transmit power through gears which are not shown in the drawings. When the motor 27 starts, the spindle 16 rotates continuously.

The second indexing means 8 has an indexing motor 30, gears 31, 32, 33, 34, a slide mechanism 35, and a shaft 36. The gear 31 is fixed to the output shaft of the indexing motor 30. The gear 32 is fixed to the shaft 36. The gear 32 engages the gear 31 while the gear 33 engages the gear 34. The spindle 16 can be indexed in the direction A by the indexing motor 30. For example, the spindle 16 can be indexed at 10 degrees or 1 degree.

However, the gear 33 can slide only along the shaft 36. A lever 37a of the slide mechanism 35 engages a portion 33a of the gear 33. If a rod 37b of a cylinder 37 contracts, the gear 33 can slide along the shaft 36 so as to leave the gear 33 from the gear 34, and thus the spindle 16 does not receive power from the motor 30. The reason for this disengagement feature, is to protect the motor 30 by keeping it from rotating while the spindle 16 is in rotation. The motor 30 can be, for example, a servo-motor.

The workholder 20 in FIG. 2 contains an air chuck 40. The cylindrical workpiece W is detachably connected to this chuck 40.

Toolhead 5

Referring to FIG. 1, a casing 41 for the toolhead 5 contains a spindle 42, the second stopping means 11 and the second driving means 10.

The spindle 42 is similar to the spindle 16 of the workhead 4. A toolholder 43 is detachably attached to the spindle 42 in the normal collet-chuck manner. A tool bit 43a for a turning operation is fixed to the toolholder 43. The second driving means 10 has a motor and gears and makes the spindle 42 rotate continuously.

Figure 3:
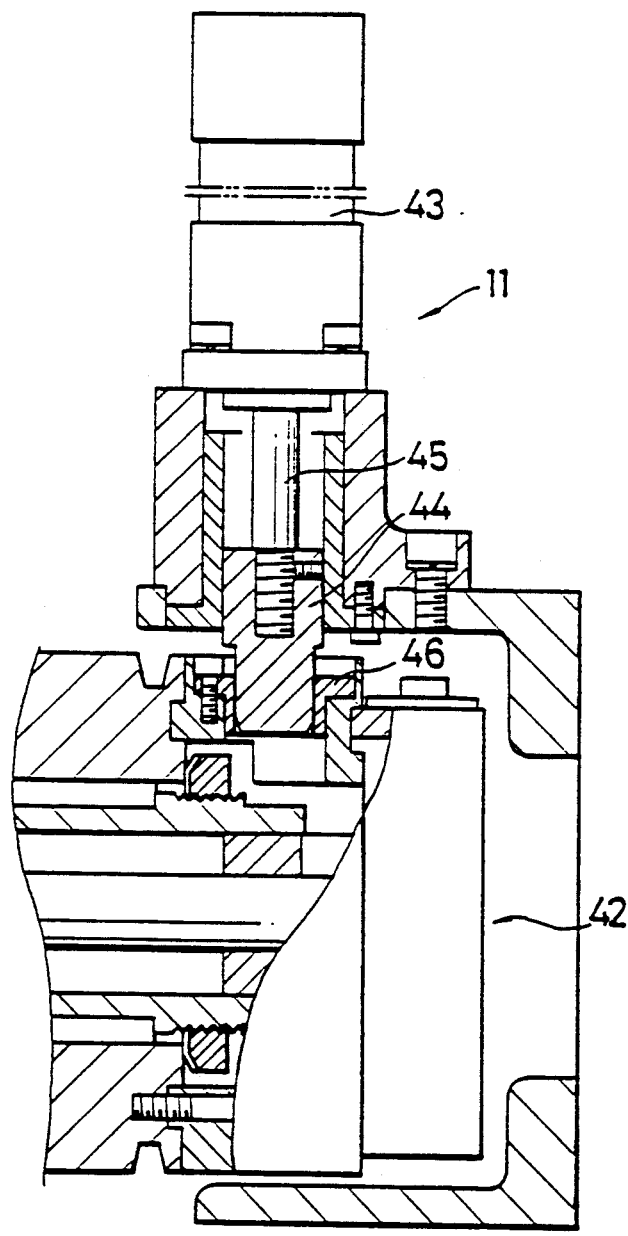
FIGS. 3 and 4 show sections of the toolhead.
Figure 4:
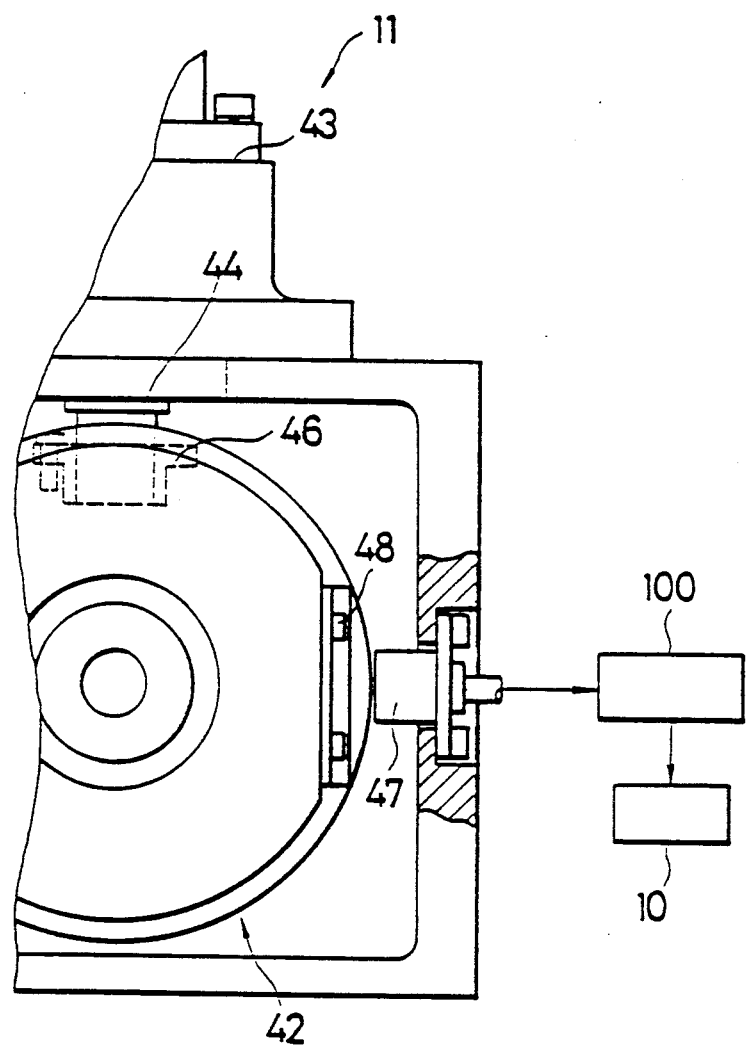

In addition, the second stopping means 11 has an air cylinder 43 and a member 44 as shown in FIGS. 3 and 4. The member 44 is attached to a rod 45 of the air cylinder 43. The rod 45 is extended far enough so the member 44 can be engaged in a concave portion 46. Thus, rotation of the spindle 42 can be stopped.

A sensor 47 is used to bring the concave portion 46 in contact with the member 44 as shown in FIG. 4. When the sensor 47 senses a detection plate 48 of the spindle 42, the spindle 42 is angularly indexed by stopping the second driving means 10 according to instructions from a CNC (computer numerical control) unit 100. The CNC unit 100 will be explained hereinafter.

First indexing means 6

The first indexing means 6 of FIG. 1 is located on the saddle 60 of the driving system 12. The first indexing means 6 has a rotary disc 51, a fixed disc 53 and a motor 52. The workhead 4 is fixed on the rotary disc 51. The rotary disc 51 can be indexed in the B direction by the motor 52. The mechanism for such indexing can be any suitable indexing device.

Driving systems 12 and 13

The driving systems 12 and 13 enable the toolholder 5 and the workhead 4 to move relative to each other in a three dimensional manner.

The driving system 12 has a saddle 60, a saddle 61, a motor 62, a motor 63, and a guide 64. The saddle 61 can be move in the direction of Z along guides 64, of the bed 2, by using the motor 63. The saddle 60 can move in the direction of X along the guide 65, of the saddle 61, by using the motor 62.

The driving system 13 has a motor 66 and guides 67. The motor 66 can move the toolholder 5 in the Y direction.

Control system

Figure 5:
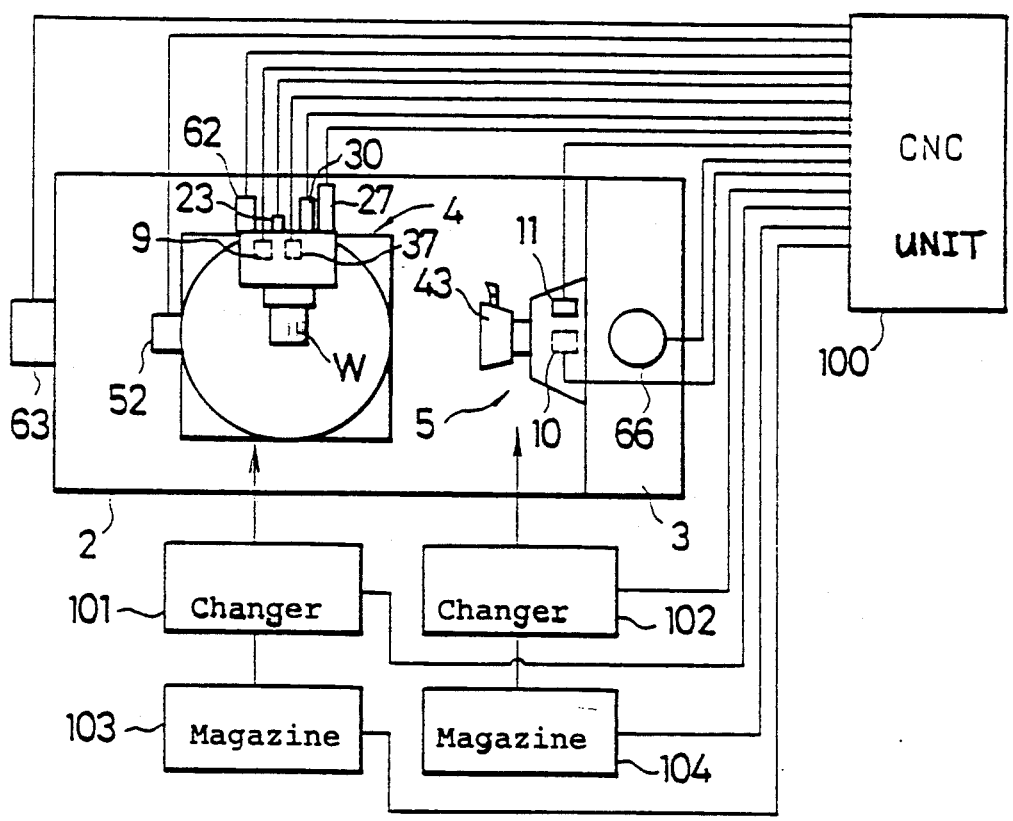
FIG. 5 shows a control system.

The components of the machine tool are controlled by the CNC unit 100 as shown in FIG. 5.

The components controlled include the motor 27, the motor 30, the first stopping means 9, the hydraulic system 23, and the motors 62, 63, and 52, which are all related to the workhead 4.

Furthermore, the second driving means 10, the second stopping means 11, and the motor 66 are also controlled by the CNC unit 100. These components are all associated with the toolhead 5. Utilizing the position signal from sensor 47 as shown in FIG. 4, the CNC unit 100 will stop the second driving means 10 if necessary. The function of changer 101 is to replace the chuck 20 of the workhead 4 with another chuck when requested. The changer 101 can, for example, be the workpiece changer described in Japanese Patent Laid Open No. 62-88536. The changer 102 can also replace the toolholder 43 of the toolhead 5 with another toolholder. The changer 102 can also adapt the changer mentioned above.

A magazine 103 contains many workholders and a magazine 104 contains many toolholders.

Operation

Figure 6:
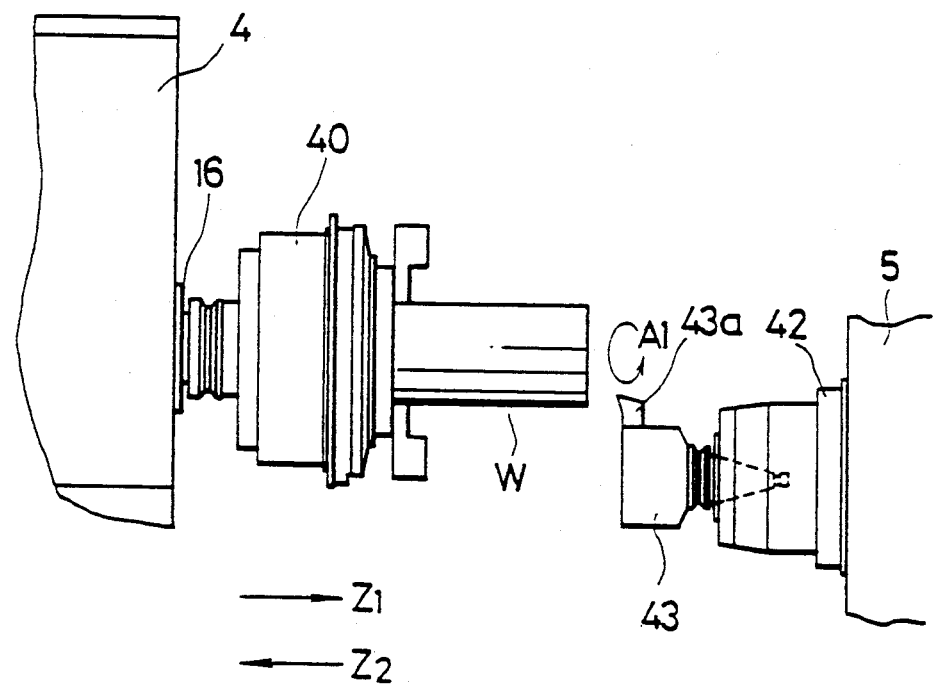
FIGS. 6, 7 and 8 show steps in processing the workpiece.
Figure 7:
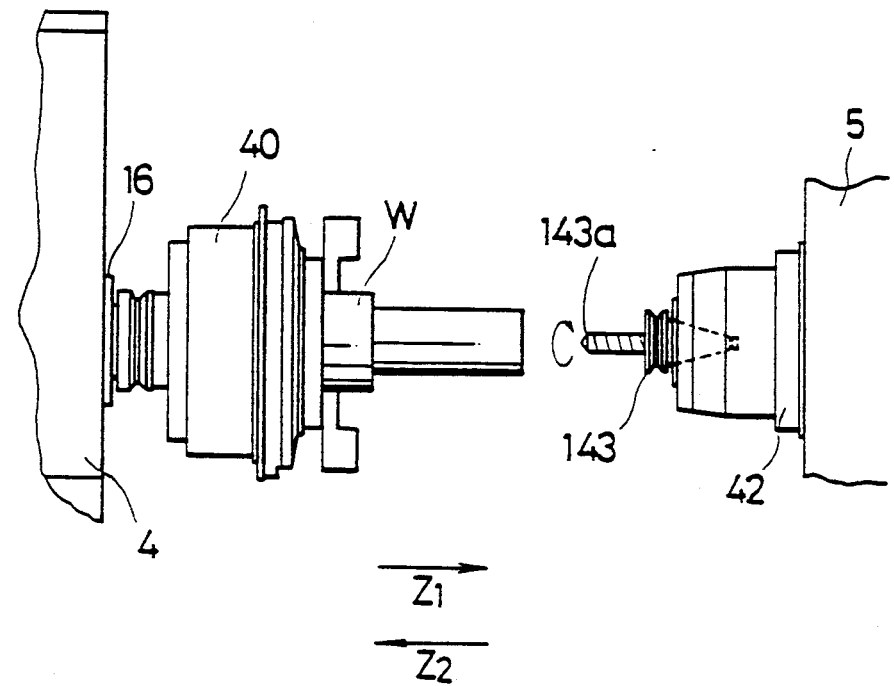
Figure 8:
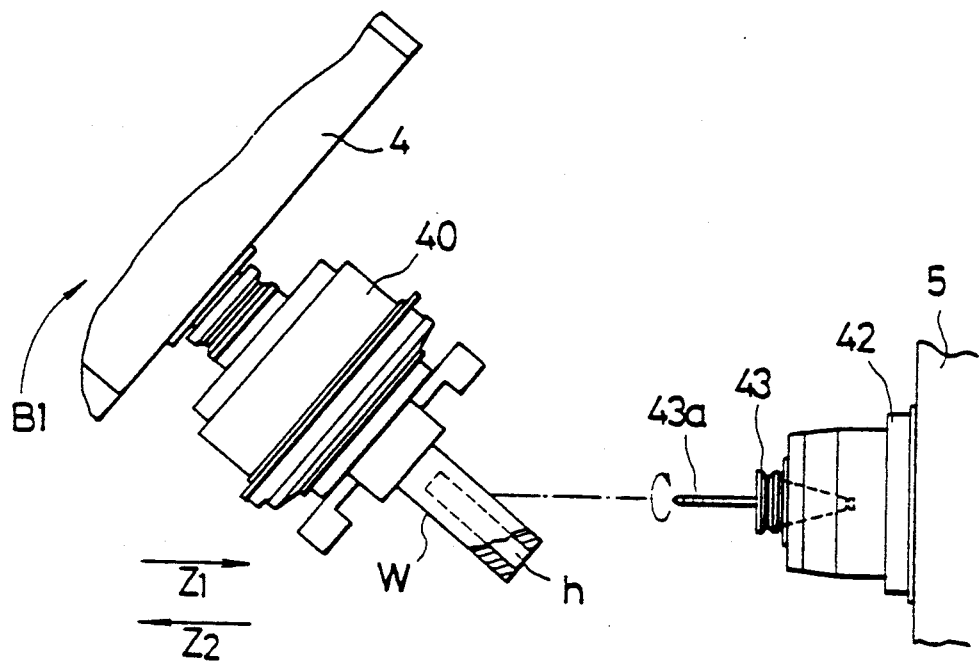
Figure 9:
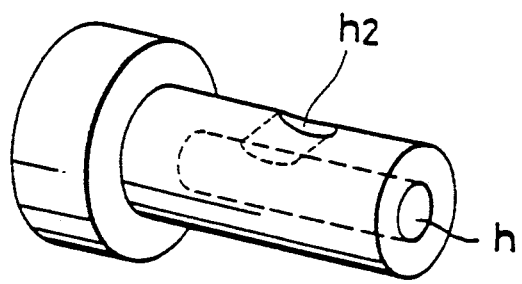
FIGS. 9, 10, 11, and 12 show a variety of sample operations carried out on the workpieces.

Multiple processing operations are performed on the workpiece W as illustrated in FIGS. 6, 7 and 8.

The workpiece W (such as a cylindrical bar) is fixed in the chuck 40 of the spindle 16 on the workhead 4 as shown in FIG. 6. The tool bit 43a is fixed to the toolholder 43 of the toolhead 5.

The toolhead 5 is adjusted to the appropriate height, in the Y direction, as shown in FIG. 1. The workhead 4 can be moved in the direction of Z1 by revolving the spindle 16 in the direction A1. The outer face of the workpiece W is turned by the tool bit 43a. At the same time, the spindle 42 of toolhead 5 does not rotate but is fixed by the member 44 of the second stopping means 11 as shown in FIG. 3. After this operation, the workhead 4 is moved back in the direction Z2.

Referring to FIG. 7, the height of toolhead 5 is adjusted. Another toolholder 143 is attached, replacing the toolholder 43 as shown in FIG. 6. This toolholder 143 has a drill 143a. The drill 143a faces the side face of the workpiece W which is held by the workholder 40. The spindle 16 is stopped from rotating and then the workhead 4 is advanced in the direction Z1. At the same time, the spindle 42 is made to rotate continuously by releasing the member 44 from the concave portion 46 of the spindle 42 in FIG. 3. By doing this, a hole h can be drilled in the workpiece W along the axis of the workpiece W as shown in FIG. 8.

The workhead 4 is returned in the direction Z2 as shown in FIG. 7. The position of the workhead 4 is indexed in the direction B1 as shown in FIG. 8. Then, a hole h2 is made in the workpiece W by moving the workhead 4 in the direction of Z1 as shown in FIG. 8. The axis of the hole h and that of hole h2 will intersect at predetermined angle.

Figure 10:
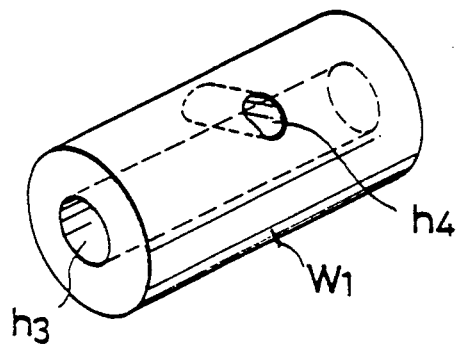
Figure 11:
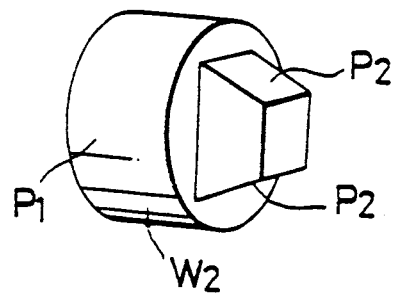
Figure 12:
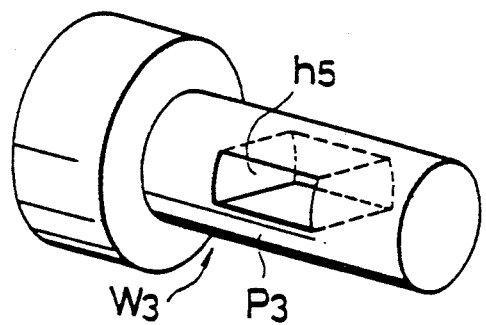

Next, other examples of multiple operations on the workpiece are shown in FIGS. 10 to 12.

The workpiece W1 shown in FIG. 10 has two holes. The axis of hole h3 and that of hole h4 intersect at an angle of 90 degrees.

In FIG. 11, the workpiece W2 consists of a round part Pl and tapered part P2.

In FIG. 12, the workpiece W3 contains a relatively small circular part P3 with a hole h5 created in the rounded side face.

This invention is not limited to the above mentioned embodiments. The toolhead 5 can be moved in the X or Z directions. Under many conditions, this eliminates the need for moving the workhead 4 along the X or Y axes. In FIG. 1, the chuck 40 of the workholder 20 is equipped with a workpiece which is round. However, the workholder 20 can also utilize a chuck that can load square materials as well.

In addition to turning and boring operations, other processing operations such as tapping and milling operations can be done by selecting the appropriate tools.

This invention makes multiple operations possible on a workpiece once the workpiece is attached onto the workhead. As a result, considerable time for loading up and unloading the workpiece is not required. Also, errors do not occur since the workpiece is not transferred from a chuck to another chuck. A machine tool of this invention can be used for performing operations such as drilling and turning operations on a workpiece.

What is claimed is:

1. A machine tool comprising:
  a workhead (4) having a spindle (16), for detachably supporting a workpiece (W);
  a toolhead (5) having a spindle (42) for detachably supporting a tool;
  a body (1) provided with the workhead (4) and the toolhead (5);
  a first indexing means (6) for indexing the axis of the spindle (16) of the workhead (4) with respect to the axis of the spindle (42) of the toolhead (5);
  a first driving means (7) for continuously rotating the spindle (16) of the workhead (4) in a first direction (A);
  a second indexing means (8) for indexing the spindle (16) of the workhead (4) in the first direction (A);
  a first stopping means (9) for stopping rotation of the spindle (16) of the workhead (4) if necessary;

a second driving means (10) for continuously rotating the spindle (42) of the toolhead (5);
  a second stopping means (11) for stopping rotation of the spindle (42) of the toolhead (5) if necessary;
  driving means (12, 13) provided on the body (1) to move the workhead (4) and the toolhead (5) relative to each other in a three dimensional manner; and
  a sensor (47) for monitoring the position of the tool spindle (42) so as to perform a turning operation of the workpiece (W).

2. A machine tool comprising:
  a workpiece supporting means (4) having a workpiece spindle (16) for mounting a workpiece (W);
  a tool supporting means (5) having a tool spindle (42) for mounting one of a plurality of tools (43a, 143a);
  a body (1) provided with the workpiece supporting means (4) and the tool supporting means (5);
  a first driving means (7) for rotating the workpiece spindle (16) when performing a turning operation of the workpiece (W) by the tool (43a);
  a first indexing means (6) for indexing the workpiece supporting means (4) about a first axis perpendicular to a second axis of the workpiece spindle (16);
  a second indexing means (8) for indexing the workpiece spindle (16) about the second axis of the workpiece spindle (16);
  a first stopping means (9) for preventing rotation of the workpiece spindle (16) when performing other machining operations of the workpiece (W) by the tool (143a);
  a second driving means (10) for rotating the tool spindle (42) when performing the machining operations of the workpiece (W);
  a second stopping means (11) for preventing rotation of the tool spindle (42) when performing the turning operation of the workpiece (W) by the tool (43);
  a drive mechanism (12, 13) for causing relative motion between the workpiece supporting means (4) and the tool supporting means (5); and
  a sensor (47) for monitoring the position of the tool spindle (42) so as to perform the turning operation of the workpiece (W).

3. The machine tool of claim 2, wherein the first stopping means (9) comprises a disc (26) fixed to the workpiece spindle (16) and a brake (25) for stopping rotation of the workpiece spindle (16) by way of the disc (26).

4. The machine tool of claim 2, wherein the workpiece spindle (16) is provided with a power chuck for holding the workpiece (W).

5. The machine tool of claim 2, wherein the workpiece supporting means (4) is associated with a first magazine containing workpiece holders, and the tool supporting means (5) is associated with a second magazine containing toolholders.

6. The machine tool of claim 2, wherein one of the tools is selected from a drill, a top, a mill or a turning tool which is mounted in the tool spindle (42).

7. The machine tool of claim 2, wherein the drive mechanism (12) comprises a first saddle (60) movable in a first direction (X) and a second saddle (61) movable in a second direction (Z), the first saddle (60) being provided with the first indexing means (6).

8. The machine tool of claim 7, wherein the tool supporting means (5) is moved in a third direction (Y) perpendicular to both the first and second directions (X, Z).

9. The machine tool of claim 2, wherein a workpiece changer (101) is arranged between the workpiece supporting means (4) and a magazine (103) for stocking workpieces and a tool changer (102) is arranged between the tool supporting means (5) and a magazine (104) for stocking tools.

10. The machine tool of claim 9, wherein the magazines (103, 104), the workpiece supporting means (4), the tool supporting means (5), and the drive mechanism (12, 13) can be controlled by a computer numerical control (100).

11. The machine tool of claim 2, wherein the toolspindle (42) comprises reflection means (48) which is sensed by the sensor (47) when positioning the tool spindle (42) to perform the turning operation of the workpiece (W).

12. The machine tool of claim 11, wherein the reflection means (48) is formed as a plate.

13. The machine tool of claim 2, wherein the sensor (47) is electrically connected to a computer numerical control unit (100).

* * * * *